May 25, 1943.  G. G. McNAMARA, JR  2,320,189
EXTENSIBLE REACH FOR VEHICLES
Filed Feb. 23, 1942
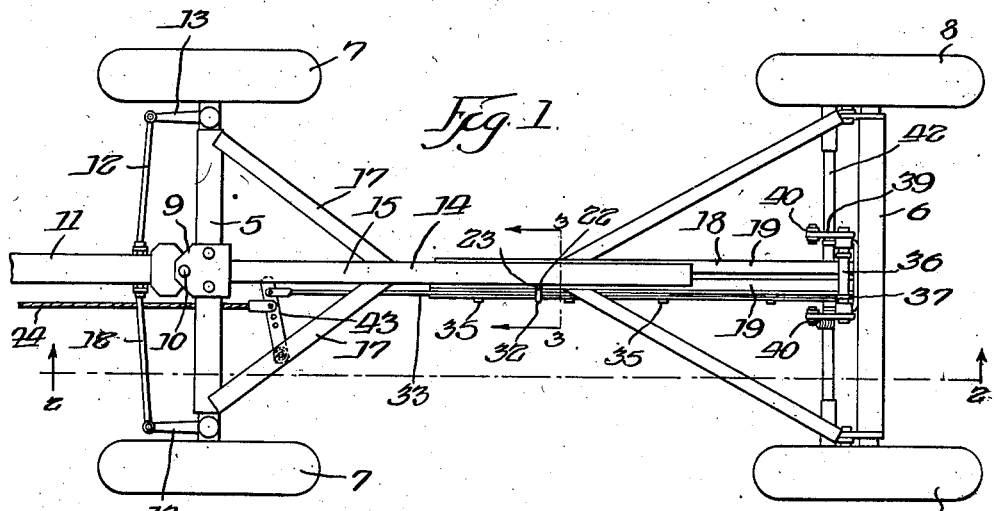
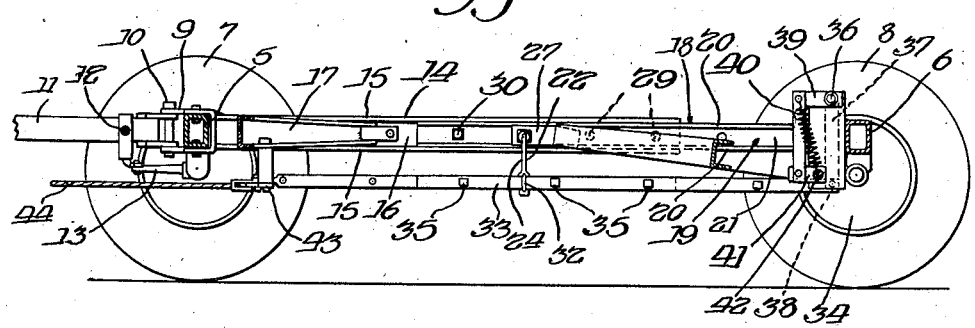
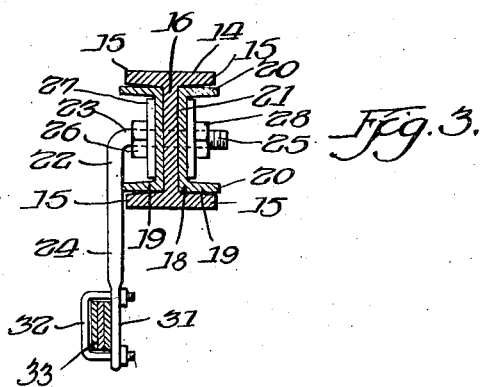
Inventor:
Gordon G. McNamara, Jr.
By Paul O. Pippel
Atty.

Patented May 25, 1943

2,320,189

UNITED STATES PATENT OFFICE 2,320,189

EXTENSIBLE REACH FOR VEHICLES

Gordon G. McNamara, Jr., Chicago, Ill., assignor to International Harvester Company, a corporation of New Jersey Application February 23, 1942, Serial No. 431,953

5 Claims. (Cl. 280—142)

This invention relates to a vehicle and more particularly to a vehicle chassis or reach construction. The invention pertains especially to improvements in reach constructions for wagons or trailers and the like.

In the trailer or wagon of the usual construction there is provided front and rear transverse wheeled axles connected together by longitudinally adjustable reach members. Problems in design have heretofore involved the necessity of providing a comparatively simple yet inexpensive reach construction, and this has been especially true in instances where it has been desired to produce light weight trailers or wagons as cheaply as possible.

The present invention contemplates and has for its principal object the provision of an improved reach construction consisting of a pair of relatively adjustable reach elements, each element interfitting with the other element so that the two are substantially self-supporting, therefore lending greater strength to the structure and at the same time permitting desirable flexibility between the front and rear axles as the wheels follow varying ground contour.

Specifically, it is an object of this invention to provide one reach element in the form of an I-beam and the other reach element in the form of a pair of channel beams, the beams interfitting with the channels respectively at the opposite sides of the I-beam.

Another important object of the invention is the provision of means for securing the reach elements together for relative longitudinal movement to vary the wheel base of the vehicle.

And another object is to provide an improved means for supporting a brake-operating element for brakes on the vehicle wheels.

A further understanding of the foregoing and other desirable objects of the invention may be had from the following detailed description taken in conjunction with the accompanying sheet of drawings, in which:

Figure 1 is a plan view of a vehicle of the trailer type embodying a preferred form of the invention;

Figure 2 is a longitudinal sectional view, as viewed along the line 2—2 of Figure 1; and Figure 3 is an enlarged transverse sectional view taken along the line 3—3 of Figure 1.

Although the present disclosure pertains to a vehicle of the light-weight trailer type, it will be apparent that the improved construction is suitably adapted to vehicles of other types, and it is accordingly not intended to limit the scope of the present invention by reference to the particular disclosure.

As shown in Figure 1, the trailer comprises generally front and rear transverse axles 5 and 6, the front axle including a pair of transversely spaced wheels 7 and the rear axle being similarly provided with wheels 8. The front axle includes a central bracket 9 which provides a pivot 10 on a vertical axis for the connection of a draft tongue 11. The front wheels are steerable through the medium of tie rods 12 connected to the tongue and steering knuckles 13. This construction is generally conventional.

The front axle has rigidly connected to the rear side thereof a longitudinal, rearwardly extending reach element 14. As best shown in Figure 3, this element is preferably an I-beam and accordingly includes opposite upper and lower end flanges 15 and an intermediate connecting flange 16. In a preferred form of the invention the intermediate flange is preferably disposed in a vertical plane passing longitudinally through the center of the trailer. A pair of brace or hound members 17 connects or braces the element 14 with respect to the front axle.

The rear axle 6 has rigidly connected to the front side thereof a longitudinally forwardly extending reach element 18. As best shown in Figures 1 and 3, this reach means consists of a pair of longitudinally extending, parallel channels or beams 19, generally U-shaped in cross section and accordingly having upper and lower or end flanges 20 and an intermediate flange 21. According to the disposition of the I-beam 14, the channels 19 are disposed with their intermediate flanges 21 vertically. These channels are disposed back to back with the inner faces of the flanges 21 spaced transversely apart a distance equal to the thickness of the intermediate flange 16 (plus practical clearance) of the I-beam 14. The channels 19 and I-beam are assembled in telescopic or extensible relationship, with the channels respectively interfitting with opposite sides of the I-beam, the I-beam in effect forming a pair of parallel channels respectively embracing the channels 19.

As best shown in Figure 3, the outer surfaces of the flanges 20 of the channels 19 substantially engage the inner surfaces of the flanges 15 of the I-beam 14. In this manner the reach elements are substantially self-supporting, particularly as respects application of vertical forces thereto. Hence, the means for securing the beams together may be comparatively simple and inexpensive. As best shown in Figures 2 and 3, this means preferably comprises a member 22 having a pair of angularly related portions 23 and 24. The portion 23 is threaded as at 25 and carries a first nut 26 thereon adjacent the portion 24. This nut provides a stop for abutting one of a pair of plates 27, respectively lying along the inner sides of the channels 19. The portion 23 thus passes through openings in the plates 27, the channels 19, and the I-beam 14, the other side of the threaded portion then receiving a second nut 28. The channels and I-beam are respectively provided with a plurality of longitudinally spaced openings, as indicated at 29, and the member 22 may be selectively inserted in any of the alined openings for the purpose of securing the channels and I-beam together in different longitudinally related positions, this means thus providing for adjustment of the reach members for varying the wheel base of the vehicle. A second securing means in the form of a bolt and nut 30 is provided for securing the channels and beam together.

The other portion 24 of the member 22, previously mentioned, extends downwardly below the reach construction and is provided with a flattened end portion 31. This portion carries a U-bolt or clip 32 through which extends a longitudinally disposed brake-operating member 33. The presently disclosed trailer is provided at the rear wheels with brake means; although, it will be obvious that the trailer may have four-wheel brakes. The reference character 34 generally indicates the brake drum (Figure 2). The brake-operating means 33 preferably consists of a pair of longitudinally adjustable members secured together by a plurality of bolts 35. When the wheel base of the trailer is altered, the bolts 35 may be removed and reinserted to new positions so that the two parts of the brake-operating member may be likewise adjusted. The relation between the brake-operating member 33 and the U-bolt 32 on the member 22 is such that the brake-operating member is slidably carried or supported in the U-bolt. Thus, the means for securing the reach members together serves also as means for supporting a portion of the brake-operating means, in this case the member 33.

The rear axle is provided with supporting structure in which is journaled a transversely extending, short rock-shaft 36 which carries a downwardly extending arm 37 to which the rear end of the brake-operating member 33 is connected, as at 38. The rock-shaft 36 also carries rigidly thereon a pair of forwardly extending arms 39, and these arms are in turn connected by vertical links 40 with a pair of short arms 41 carried on a lower and longer rock-shaft 42. This rock-shaft is operatively associated with brake shoes, not shown, contained in the brake mechanism, all of which may be conventional. The forward end of the brake-operating member 33 is supported at one end of a swinging arm 43 pivoted on one of the hounds 17 on a vertical axis. A brake-operating cable 44 extends forwardly alongside the draft tongue 11 and may be operated by the draft vehicle, not shown, in the usual manner. Longitudinal movement of the brake-operating member results in rocking of the rock-shafts 36 and 42 and consequently application of the braking mechanism. The particular brake means shown forms no part of the present invention except that it serves to illustrate the supporting of the brake-operating member 33 by the means 22.

It will thus be seen from the foregoing that the improved reach construction provides a simple arrangement of only three reach members, these members being associated in such manner as to provide increased strength and yet to permit desirable flexibility of the entire structure as the trailer wheels encounter varying ground contour. The means for securing the reach members together is comparatively simple and at the same time provides means for supporting a brake-operating member for trailer brake mechanism.

Other advantages and features of the invention will become readily apparent to those versed in the art. It will be understood, of course, that only a preferred embodiment of the invention has been illustrated and described and that numerous modifications and alterations may be made therein without departing from the spriit and scope of the present invention as defined by the appended claims.

What is claimed is:

1. A reach structure for a vehicle having front and rear transverse axles, comprising a first reach comprising a longitudinally extending member of I cross-section having upper and lower horizontal flanges and a vertical connecting flange, means securing said member to one axle, a second reach means including a pair of longitudinal channel members, each having a vertical cross-flange and a pair of horizontal end-flanges, said members being arranged in telescopic relation to the first reach member with the channels respectively interfitting with the first member respectively at opposite sides of the connecting flange of the I, means securing said three reach members together, and means securing said pair of reach members to the other axle.

2. A reach structure for a vehicle having front and rear transverse axles, comprising a first reach means including a pair of opposed, longitudinal channels disposed back to back, means connecting said means to one axle, a seocnd reach means including a pair of opposed, longitudinal channels disposed back to back, the cross-sectional dimensions of said second channels being respectively less than those of the first channels and said second reach means being arranged in telescopic arrangement with the first reach means with the first channels respectively embracing the second channels, means securing the first and second channels together, and means securing the second channels to the other axle.

3. A reach structure for a vehicle having front and rear transverse wheeled axles and brake means on at least one axle, comprising a first reach means including a pair of opposed, longitudinal channels disposed back to back, means connecting said means to one axle, a second reach means including a pair of opposed, longitudinal channels disposed back to back, the cross-sectional dimensions of said second channels being respectively less than those of the first channels and said second reach means being arranged in telescopic arrangement with the first reach means with the first channels respectively embracing the second channels, a generally longitudinally extending brake-operating member, means securing said first and second channels together including a support for the brake-operating member, and means securing the second channels to the other axle.

4. A reach structure for a vehicle having front and rear transverse wheeled axles and brake means on at least one axle, comprising a first reach means including a pair of opposed, longitudinal channels disposed back to back, means connecting said means to one axle, a second reach means including a pair of opposed, longitudinal channels disposed back to back, the cross-sectional dimensions of said second channels being respectively less than those of the first channels and said second reach means being arranged in telescopic arrangement with the first reach means with the first channels respectively embracing the second channels, a generally longitudinally extending brake-operating member, means securing said first and second channels together comprising a member having two angularly related end portions for respectively engaging the channels and supporting the brake-operating member, and means securing the second channels to the other axle.

5. An adjustable frame structure for a vehicle having front and rear transverse axles, comprising a longitudinal I-beam secured to one axle, a pair of longitudinal, paralell channel beams secured to the other axle and telescopically interfitting with the I-beam, and means securing said I-beam and channel beams together for relative longitudinal adjustment.

GORDON G. McNAMARA, JR.